United States Patent [19]

Sato

[11] Patent Number: 4,738,491

[45] Date of Patent: Apr. 19, 1988

[54] ANTI-LOCK BRAKE DEVICE

[75] Inventor: Makoto Sato, Kamifukuoka, Japan

[73] Assignee: Honda Giken Kogyo Kabushiki Kaisha, Tokyo, Japan

[21] Appl. No.: 754,317

[22] Filed: Jul. 12, 1985

[30] Foreign Application Priority Data

Jul. 25, 1984 [JP] Japan .................. 59-154237

[51] Int. Cl.$^4$ .......................................... B60T 8/02
[52] U.S. Cl. ........................... 303/106; 303/109
[58] Field of Search ............... 303/109, 96, 97, 92, 303/93, 100, 105, 106, 107, 110; 188/181 A, 181 R, 181 C

[56] References Cited

U.S. PATENT DOCUMENTS

| | | | |
|---|---|---|---|
| 3,804,469 | 4/1974 | Takeuchi et al. | 303/106 |
| 3,909,071 | 9/1975 | Klatt | 303/106 |
| 4,395,761 | 7/1983 | Sato et al. | 303/105 |

FOREIGN PATENT DOCUMENTS 1603459  11/1981  United Kingdom .............. 303/106

Primary Examiner—John W. Caldwell, Sr.
Assistant Examiner—Alvin Oberley
Attorney, Agent, or Firm—Armstrong, Nikaido, Marmelstein & Kubovcik

[57] ABSTRACT

An anti-lock brake device for use with wheel brakes connected to wheels of a vehicle is disclosed having a hydraulic pressure control circuit for controlling the application of hydraulic brake pressure to the wheel brake and a control element for detecting whether the wheels are likely to lock from rotational velocity characteristics of the wheels and operating said hydraulic pressure control circuit to reduce said hydraulic brake pressure applied to said wheel brakes when said wheels are likely to lock. The control element further includes a decision circuit for outputting a signal on the assumption that one condition for reducing the hydraulic brake pressure has been satisfied when the wheel velocity is lower than a reference wheel velocity, and a delay circuit for outputting an operating signal for nullifying the signal output from the decision circuit until a predetermined period of time has elapsed after the signal is received from the decision circuit.

3 Claims, 4 Drawing Sheets

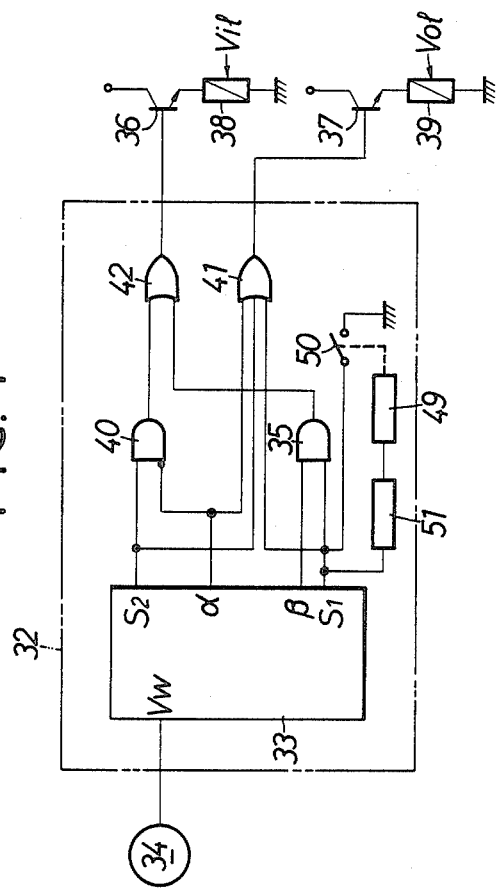
FIG. 7
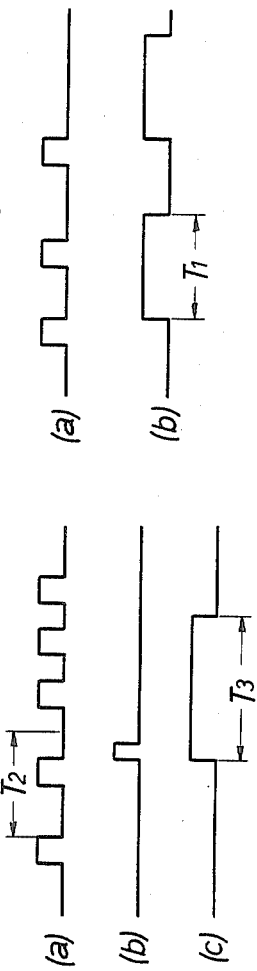
FIG. 5
FIG. 8

ANTI-LOCK BRAKE DEVICE

BACKGROUND OF THE INVENTION

A. Field of the Invention

This invention relates to an anti-lock brake device comprising wheel brakes, a hydraulic pressure control circuit for controlling the application of hydraulic brake pressure to the wheel brakes, and control means for detecting whether wheels are likely to lock from the rotational velocity characteristics of the wheels and for operating the hydraulic control circuit to reduce the hydraulic brake pressure applied to the wheel brakes when the wheels are likely to lock.

B. Background Information

The conventional anti-lock brake device may cause oscillation of the vehicle suspension in the longitudinal direction and pulsations in the vehicle velocity in proportion thereto if it is applied to provide braking while the vehicle is traveling on a rough road. This is because the braking force applied to the wheels changes as the ground contact of the wheels varies, even though hydraulic pressure is constant. If such pulsations are generated, the control means may mistakenly judge that the wheels are likely to lock even when they are unlikely to do so, and operate the hydraulic pressure control circuit to reduce the hydraulic pressure, thus reducing braking effectiveness and increasing the braking distance.

SUMMARY OF THE INVENTION

In view of the above, an object of the present invention is to provide an anti-lock brake device capable of preventing an increase in the braking distance when the vehicle is traveling on a rough road.

The control means according to a first embodiment of the present invention comprises decision means for outputting a signal on the assumption that one condition for reducing hydraulic pressure has been satisfied when the wheel velocity is lower than a predetermined reference wheel velocity, and delay means for outputting an operating signal which nullifies the signal output from the decision means until a predetermined time has elapsed after the signal is received from the decision means.

The control means according to a second embodiment of the present invention comprises decision means for outputting a signal on the assumption that one condition for reducing hydraulic pressure has been satisfied when the wheel velocity is lower than a predetermined reference wheel velocity, signal generation interval detection means for detecting whether the interval after which the signal is output is smaller than a predetermined interval and outputting a signal when it is smaller than the predetermined interval, and delay means for outputting an operating signal which nullifies the signal output from the decision means until a predetermined time has elapsed, according to the signal input from the decision means.

BRIEF DESCRIPTION OF THE DRAWINGS

FIGS. 1 through 6 show an embodiment of the present invention in which:

FIG. 1 is a hydraulic control circuit diagram;

FIG. 2 is a circuit diagram of the configuration of control means;

FIG. 3 is a diagram of an electrical circuit for estimating the vehicle velocity;

FIG. 4 is a graph of the operating characteristics derived from the electric circuit of FIG. 3;

FIG. 5(a) illustrates the characteristics of a delay circuit showing a decision circuit output chart;

FIG. 5(b) illustrates the characteristics of a delay circuit showing a delay circuit output chart;

FIG. 6 is a characteristic graph of the operational characteristics of various elements of the anti-lock device;

FIG. 7 is an oil pressure control circuit diagram of a second embodiment of the present invention; and FIGS. 8(a), (b), (c) are graphs illustrating the characteristics of a signal generation interval detection circuit and a delay circuit of the second embodiment of the present invention where (a) shows a decision circuit output, (b) shows a signal generation interval detection circuit output, and (c) shows a delay circuit output.

DETAILED DESCRIPTION OF PREFERRED EMBODIMENTS

Figure 1:
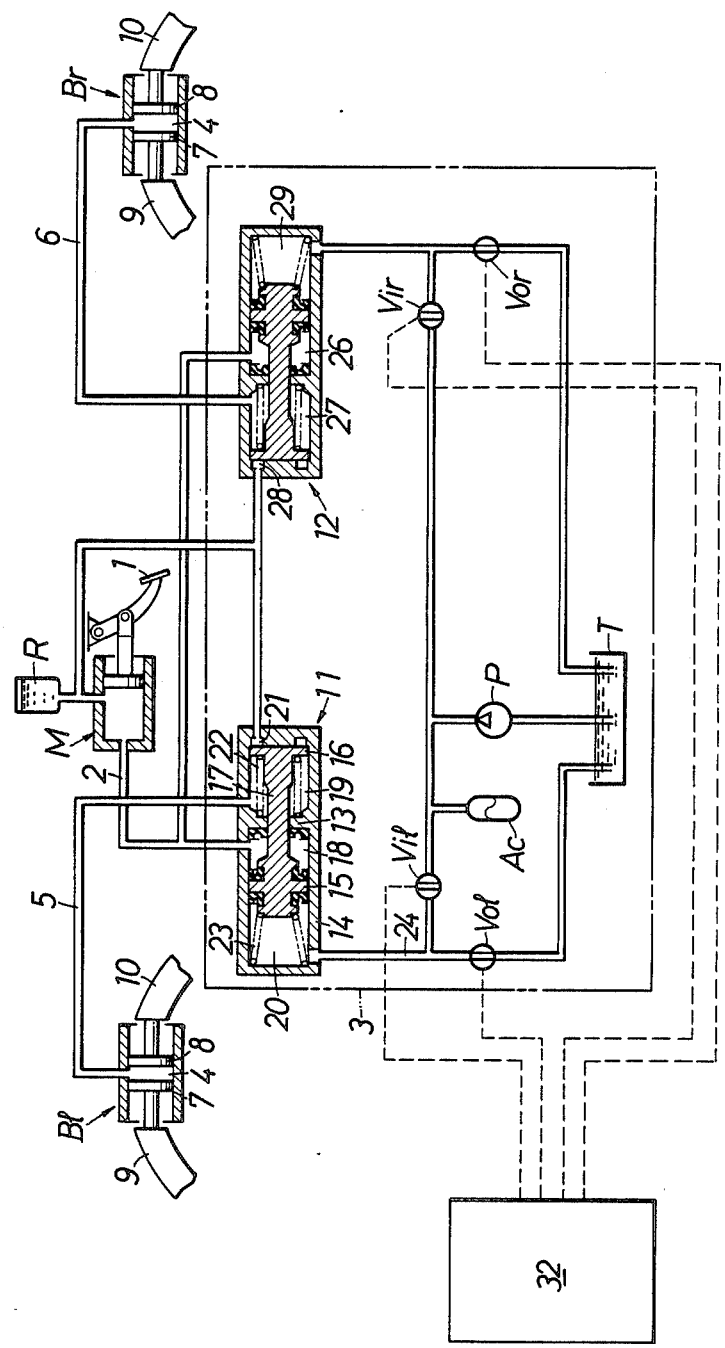

The present invention will now be described with reference to the drawings. In the diagram of FIG. 1, which illustrates the first embodiment of the present invention, a brake pedal 1 is linked to a master cylinder M so that, when the driver steps on pedal 1, the master cylinder M generates hydraulic pressure in an oil passage 2. The oil passage 2 is connected to a hydraulic control circuit 3 and brake pressure corresponding to that hydraulic pressure is output from the hydraulic control circuit 3.

Front and rear wheels on each side of the vehicle are each equipped with wheel brakes, and the brake pressure is applied from the hydraulic pressure control circuit 3 to the wheel brakes. Since the wheel brakes for the front and rear wheels of vehicle and the hydraulic pressure control circuits 3 are generally the same in configuration, a wheel brake Bl is illustrated for the left rear wheel and another Br is illustrated for the right rear wheel. The hydraulic pressure control circuit 3 related to the brakes Bl and Br alone will be described below.

Oil passages 5, 6 from the hydraulic pressure control circuit 3 are so arranged that they communicate with brake chambers 4 of the wheel brakes Bl and Br, respectively. The brake pressure supplied to each of the brake chambers 4 makes pistons 7, 8 thereof move in directions which are opposite to each other, and brake shoes 9 and 10 contact brake drums (not shown), to produce braking torque.

If the brake pressure in each brake chamber 4 is too high, the baking torque produced between the brake shoes 9, 10 and the corresponding brake drums will become excessive, thus causing the wheels to lock-up. For this reason, the hydraulic pressure control circuit 3 operates to reduce the brake pressure when the wheels are likely to lock, thus preventing the wheels from locking.

The hydraulic pressure control circuit 3 is equipped with modulators 11, 12 corresponding to the wheel brakes Bl, Br. Since these modulators 11, 12 basically have the same construction, only the modulator 11 on one side will be described in detail. The modulator 11 comprises a cylinder 14 with closed ends and a partition 13 dividing it into two compartments, and a rod 17 provided with a pair of pistons 15, 16 at each end, the partition 13 slidably supporting the portion of rod 17 between the pistons 15, 16 in the axial direction. One cylinder compartment between the partition 13 and the piston 15 is arranged as a primary hydraulic brake chamber 18 which communicates with the master cylinder M through the oil passage 2. The other compartment between the partition 13 and the other piston 16 is arranged as a secondary hydraulic brake chamber 19 which communicates with the brake chamber 4 of the wheel brake Bl through the oil passage 5. An anti-lock control hydraulic chamber 20 is provided between one end wall of the cylinder 14 and the piston 15, and an oil release chamber 21 is provided between the other wall of the cylinder and the piston 16. The oil release chamber 21 communicates with the reservoir R of the master cylinder M. In addition, a spring 22 biases the piston 16 in a direction away from the partition 13 and is contained in the secondary hydraulic brake chamber 19. A spring 23 biases piston 15 in a direction toward the partition 13 and is contained in the anti-lock control hydraulic chamber 20.

An oil passage 24 is connected to the anti-lock control hydraulic chamber 20, and also to a hydraulic pump P through a normally-closed inlet valve Vil and to an oil tank T through a normally-open outlet valve Vol. An accumulator Ac is connected between the inlet valve Vil and the hydraulic pump P.

Similarly, in the other modulator 12, a primary hydraulic brake chamber 26, a secondary hydraulic brake chamber 27, and an oil release chamber 28 communicate respectively with the master cylinder M, the wheel brake Br, and the reservoir R. An anti-lock control hydraulic chamber 29 is connected to the hydraulic pump P through a normally-closed inlet valve Vir and to the oil tank T through a normally-open outlet valve Vor.

The inlet valves Vil, Vir and the outlet valves Vol, Vor, which are solenoid valves, are controlled by control means 32 so as to be opened and closed.

While the inlet valves Vil, Vir are closed and the outlet valves Vol, Vor open, the anti-lock control hydraulic chambers 20, 29 are open to the oil tank T and, when hydraulic pressure is applied from the master cylinder to the primary control hydraulic chambers 18, 26 by the action of the brake pedal 1, the capacities of the secondary control hydraulic chambers 19, 27 decrease, while brake pressure corresponding to the hydraulic pressure from the master cylinder M is applied to the brake chambers of the wheel brakes Bl, Br. As a result, the braking torque increases freely in response to the braking operation conducted by the driver.

If the outlet valves Vol, Vor are closed when the inlet valves Vil, Vir are closed, the control pressure in the anti-lock control hydraulic chambers 20, 19 will be in a lock status. Accordingly, the capacities of the secondary control hydraulic chambers 19, 27 of the modulators 11, 12 will not change, irrespective of any increase or decrease in the hydraulic pressure applied to the primary control hydraulic chambers 18, 26. As a result, the braking torque is maintained at a constant level, irrespective of the braking operation conducted by the driver. This operating condition conforms to the case in which the wheels are likely to lock.

If the inlet valves Vil, Vir are opened when the outlet valves Vol, Vor are closed, the capacities of the secondary hydraulic brake chambers 19, 27 will increase, and the hydraulic pressure in the brake chambers 4 of the wheel brakes Bl, Br will decrease, because anti-lock control hydraulic pressure is applied to the anti-lock control hydraulic chambers 20, 29, despite the fact that the hydraulic pressure from the master cylinder is affecting the primary control hydraulic chambers 18, 26, so that the braking torque could be reduced. Consequently, the wheels can be prevented from locking when they are likely to do so by opening the inlet valves Vil, Vir and closing the outlet valves Vol, Vor.

Figure 2:
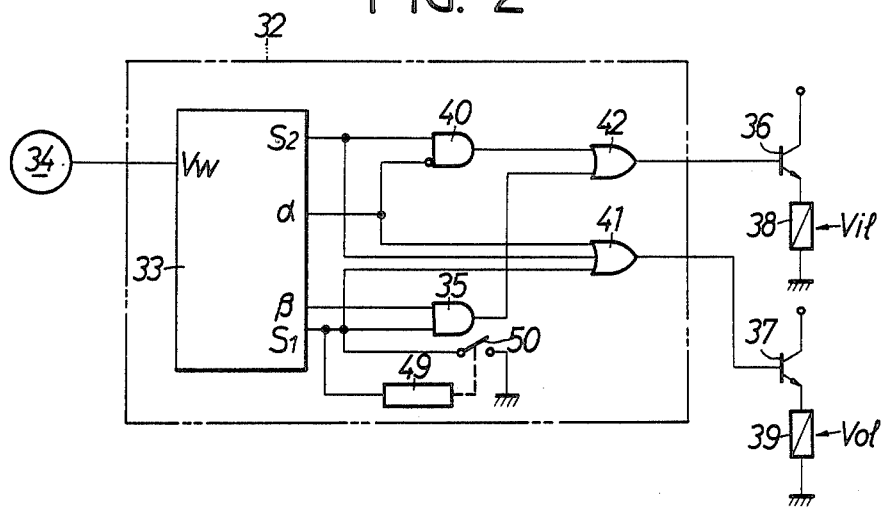

The configuration of the control means 32 will now be described with reference to FIG. 2. Since the arrangement which controls the inlet valve Vil and outlet valve Vol corresponding to one brake Bl is basically the same as that which controls the inlet valve Vir and outlet valve Vor of the other brake Br, the description will solely concern the arrangement which controls the inlet valve Vil and the outlet valve Vol on one side.

The control means 32 is equipped with decision means which is a decision circuit 33 in the form of a microcomputer. The decision circuit 33 determines whether or not the wheels are locked and, based on the decision result, outputs a signal causing the inlet and outlet valves Vil, and Vol to be opened and closed, respectively.

The consideration of the criteria governing the decision of whether to output the anti-lock control signal, provided that necessary conditions have been established, is usually based on one of the following four methods (a)–(d):

(a) A method of easing the brake pressure by outputting a signal $\beta$ when the wheel acceleration $\dot{V}w <$ reference wheel deceleration $-\dot{V}w_0$;

(b) A method of easing the brake pressure by outputting signal $S_1$ when the wheel velocity $\dot{V}w <$ a first reference wheel velocity $Vr_1$. However, if a vehicle velocity is Vv and a suitable wheel slip ratio is $\lambda_1$, then $Vr_1 = Vv \cdot (1-\lambda_1)$. So when relationships of slip ratio is defined as $\lambda$, the two wheel $\dot{V}w > Vr_1$ and $\lambda < \lambda_1$ have the same meaning, so that the signal $S_1$ can be output when $\dot{V}w < Vr_1$ or $\lambda > \lambda_1$ is satisfied;

(c) A method of easing the brake oil pressure when either (a) or (b) is satisfied; and (d) A method of easing the brake oil pressure when both (a) and (b) are simultaneously satisfied.

In method (a), the reference wheel deceleration $-\dot{V}w_0$ is normally set to a value which is not going to be generated during braking in which wheel lock is unlikely to occur, for example, $-2.0$ to $1.2$ G. However, if this method is employed to effect braking on a snowy road or frozen slope, a wheel deceleration of about $-1.0$ to $-0.5$ G may be generated, and no signal releasing the brake pressure is produced despite the fact that the wheels will lock in the latter part of the braking operation. Meanwhile, the wheel acceleration $\dot{V}w$ will pulsate minutely during normal braking while traveling along a rough road, and a signal $\beta$ will be output to reduce the braking efficiency even when there is no fear of wheel lock.

In method (b) it is judged that the brake pressure has been eased sufficiently, provided that the wheel velocity Vw is increasing, even though the slip ratio $\lambda$ has increased, or the signal $S_1$ has been output. However, the brake pressure is still to be eased as long as signal $S_1$ is output, resulting in lowering of the braking efficiency.

It is obvious that method (c) is not free from the shortcoming of methods (a) and (b).

Method (d) can be employed to solve these problems, including the reduction in braking efficiency when traveling on a rough road, and that caused by reduced brake pressure when the wheel velocity Vw increases. It is also possible to ease the brake pressure when the wheel deceleration reaches $-1.0$ to $-0.5$ G when braking on snowy roads, frozen slopes, etc., provided that the reference wheel deceleration $-\dot{V}w_0$ is set within a wheel deceleration range, for instance, $-1.0$ to $0$ G, preferably $-0.3$ to $-0.6$ G, generated when braking on a normal road.

Accordingly, a signal corresponding to the wheel velocity Vw is applied to a wheel velocity detector 34 in the decision circuit 33, and the wheel velocity $\dot{V}w$ and the wheel acceleration $\dot{V}w$ computed from the wheel velocity Vw are compared, as mentioned above, with the first reference wheel velocity $Vr_1$ and the reference wheel deceleration $-\dot{V}w_0$, respectively. When both of the conditions:

$$\dot{V}w < -\dot{V}w_0$$

$$Vw < Vr_1$$

are satisfied, the corresponding high-level signals $\beta$, $S_1$ are output from the decision circuit 33. These signals $\beta$, $S_1$ are applied to an AND gate 35. When both signals are at high level, a transistor 36 turns on, energizing a solenoid 38, and opening the inlet valve Vil. In addition, when the high-level signal $S_1$ is output, a transistor 37 turns on and the outlet valve Vol closes.

When signals $\beta$, $S_1$ are used to try to reduce the braking torque, the wheel velocity is still decreasing, this meaning that the braking torque is still larger than the driving torque on the road surface and that the fear of wheel lock is not always completely eliminated at this moment. However, as the brake pressure is further reduced even after the release signal has been extinguished, because of the actuation lag of roughly 10 ms which is common to such systems in general, favorable results are normally obtainable from this method. However, the degree of reduction can sometimes be insufficient, depending on the road conditions, and thus the wheel velocity may still be likely to induce locking. In order to prevent this sort of phenomenon, it is preferable to ensure that the generation of the release signal continues until the wheel velocity Vw has definitely started increasing, when $\lambda > \lambda_1$. However, since the release signal is maintained until $\dot{V}w > 0$, despite the fact that the excellent control is possible even if the release signal is interrupted when $\dot{V}w > -\dot{V}w$, this method has the disadvantage that the braking torque is reduced too much. This presents no problems in practice for wheels with a smaller brake load distribution.

A second reference wheel velocity $Vr_2$, equivalent to a second reference slip ratio $\lambda_2$, is set such that $\lambda_2 > \lambda_1$, and the release signal is output continuously until the wheel velocity Vw starts to accelerate, only when the possibility of locking becomes greater when $Vw < Vr_2$ or $\lambda > \lambda_2$. That is, the decision circuit 33 judges whether $Vw < Vr_2$ or $\lambda > \lambda_2$ and outputs a signal $S_2$ only when these conditions are satisfied. The circuit sets an acceleration reference value $+\dot{V}w_0$ in order to judge that the wheel velocity Vw is increasing, and outputs a signal $\alpha$ when $Vw > +\dot{V}w_0$.

The signal $S_2$ is applied to one input terminal of AND gate 40 and also to OR gate 41, and the signal $\alpha$ is applied to OR gate 41 and is inverted and then applied to AND gate 40. The signal $S_1$ is also applied to the OR gate 41, and the output of the OR gate 41 is applied to the base of the transistor 37. The outputs of both the AND gates 35, 40 are applied to OR gate 42, and the output of the OR gate 42 is applied to the base of the transistor 36.

According to the control means 32, the transistor 37 turns on to close the outlet valve Vol when any of the signals $S_1$, $\alpha$, or $S_2$ is at high level. On the other hand, the inlet valve Vil is opened when both the signals $\beta$, $S_1$ are at high level, or when the signal $S_2$ rises to high level but the signal $\alpha$ remains at low level.

The method of setting the first and second reference wheel velocities $Vr_1$, $Vr_2$ will now be described. These are ideally determined by detecting the vehicle velocity Vv and adding suitable reference slip ratios $\lambda_1$, $\lambda_2$, as given by the following equations:

$$Vr_1 = Vv(1-\lambda_1)$$

$$Vr_2 = Vv(1-\lambda_2)$$

Figure 3:
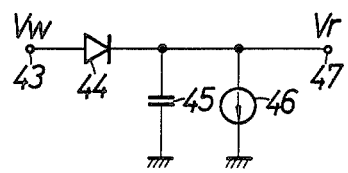

However, no practical means has been proposed for detecting the vehicle speed Vv. Consequently, it is generally accepted to employ a method of assuming the temporary vehicle velocity Vr from changes in the wheel velocity Vw. FIG. 3 shows a basic circuit for that purpose.

Figure 4:
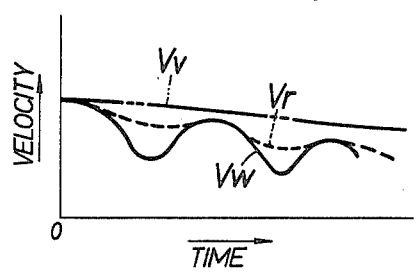

In FIG. 3, the wheel velocity Vw is input to an input terminal 43 which has an output end 47 connected through an ideal diode 44, a memory capacitor 45, and a constant current discharge circuit 46, so that the vehicle velocity Vr is output from the output terminal 47. That is, the peak values of the wheel velocity Vw during the anti-lock operation in FIG. 4 are assumed to be close to the vehicle velocity Vv, and the crests in the wheel velocity Vw are joined by a certain slope to estimate the temporary vehicle velocity Vr.

When the vehicle travels on a rough road, the control means 32 is provided with a function for reducing the degree of reduction in the brake pressure if the wheels are determined to be locked, in order to avoid lowering the brake efficiency by erroneously judging that the wheels are likely to lock from the pulsations of the wheel velocity Vw, and excessively reducing the brake pressure.

In other words, the signal $S_1$ output from the decision circuit 33 is also given to a delay circuit 49 which outputs an operating signal for a certain period of time $T_1$, for instance 100 ms, after the signal $S_1$ falls, as shown in FIG. 5(b) while the signal $S_1$ is output from the decision circuit 33. For the time $T_1$, the intervals at which the signal $S_1$ is generated while traveling on a bad road should be examined and determined beforehand, so that the vehicle may be determined to be traveling along a rough road when a subsequent signal $S_1$ is output within the time $T_1$.

The output terminal of the decision circuit 33 from which the signal $S_1$ is output is grounded through a relay switch 50, and the relay switch 50 is turned on by the receipt of the operating signal from the delay circuit 49. Accordingly, the relay switch 50 stays on until the time $T_1$ has elapsed after the signal $S_1$ falls, so that, even though the signal $S_1$ may be output from the decision circuit 33 in the meantime, the signal $S_1$ is forced to stay at low level.

While the vehicle is traveling on a rough road, the degree of reduction in the brake pressure and thus the reduction in braking efficiency is prevented from decreasing because of an unnecessary reduction in the brake pressure.

Figure 6:
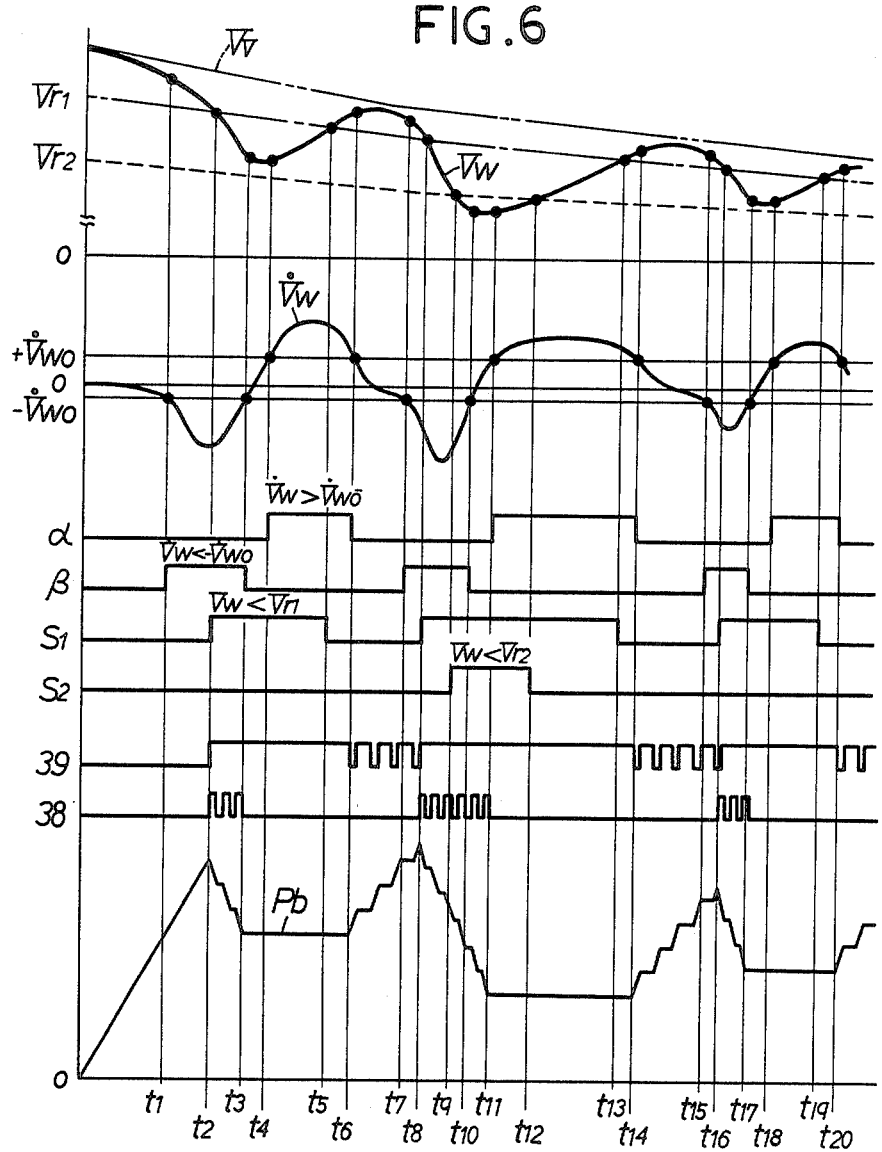

Operation of this embodiment of the present invention will be be described with reference to FIG. 6. FIG. 6 is one example of the operating mode of an anti-lock control apparatus, wherein the time elapsed after the start of control is shown along the abscissa and the vehicle velocity Vv, the wheel velocity Vw, the first and second reference wheel velocities $V_{r1}$ and $V_{r2}$, respectively, at the top of the ordinate; the wheel acceleration $\dot{V}w$, a velocity-increase reference value $+\dot{V}w_0$, and reference wheel deceleration $-\dot{V}w_0$ below that; the operational statuses of the signals $\alpha$, $\beta$, $S_1$, $S_2$ and solenoids 38, 39 lower still; and brake pressure Pb at the bottom.

Immediately after braking is started at time t=0, the outputs of the signals $\alpha$, $\beta$, $S_1$, $S_2$ are maintained at low level and the brake pressure Pb gradually increases, while the wheel velocity $\dot{V}w$ and the wheel acceleration $\dot{V}w$ gradually decrease.

If the wheel acceleration $\dot{V}w$ becomes smaller than the reference wheel deceleration $-Vw_0$ at time $t_1$ ($\dot{V}w < -\dot{V}w_0$), the level of the signal $\beta$ will rise, but the signal $S_1$ will remain at low level because the wheel velocity Vw is greater than the first reference wheel velocity $V_{r1}$. Consequently, the brake pressure Pb continues to increase, while the wheel velocity Vw and the wheel acceleration $\dot{V}w$ continue to decrease.

At time $t_2$, when the wheel velocity Vw becomes lower than the first reference wheel velocity $V_{r1}$, the signal $S_1$ rises and the level of the output of the AND gate 35 reaches a high level, so that the outputs of the OR gates 42 and 41 also rise. Thus the solenoids 38, 39 are energized and the inlet valve Vil and the outlet valve Vol are opened and closed, respectively. The brake pressure Pb then begins to decrease, but the wheel acceleration $\dot{V}w$ starts to increase. At this time, the wheel velocity Vw continues to decrease.

At time $t_3$, when the wheel acceleration $\dot{V}w$ becomes greater than the reference wheel deceleration $-\dot{V}w$ ($\dot{V}w > -\dot{V}w_0$), the level of the signal $\beta$ falls, which makes the output of AND gate 35 fall as well. This means that the solenoid 38 of the inlet valve Vil is demagnetized and the inlet valve Vil is shut. Thus, the brake pressure Pb is kept constant; that is, the braking torque is held roughly constant. The wheel velocity Vw then begins to increase.

At time $t_4$, when the wheel acceleration $\dot{V}w$ becomes greater than the velocity-increase reference value $+\dot{V}w_0$ ($\dot{V}w > +\dot{V}w_0$), the level of the signal $\alpha$ rises. At time $t_5$, when the wheel velocity Vw exceeds the first reference wheel velocity $V_{r1}$, the level of the signal $S_1$ falls. At time $t_6$, when the wheel acceleration $\dot{V}w$ becomes lower than the velocity-increase reference value $+\dot{V}w_0$, the signal $\alpha$ falls and the outlet valve Vol is opened. The brake pressure Pb is thus increased.

At time $t_7$, when the wheel acceleration $\dot{V}w$ becomes smaller than the reference wheel deceleration $-\dot{V}w_0$ ($\dot{V}w < +\dot{V}w_0$), the signal $\alpha$ rises. At time $T_8$, when the wheel velocity Vw becomes lower than the first reference wheel velocity $V_{r1}$ ($Vw < V_{r1}$), the signal $S_1$ rises, and consequently the output of the AND gate 35 also rises, making the inlet valve Vil closed and the output valve Vol open, and the brake pressure Pb begins to decrease. Subsequently, at time $t_9$, when the wheel velocity Vw becomes lower than the second reference wheel velocity $V_{r2}$ ($Vw < V_{r2}$), increasing the risk of wheel locking, the signal $S_2$ rises.

At time $t_{10}$, when the wheel acceleration $\dot{V}w$ becomes greater than the reference wheel deceleration $+\dot{V}w$, the level of the signal $\beta$ drops, but the brake pressure Pb decreases further and the wheel velocity Vw starts to increase. At time $t_{11}$, when the wheel acceleration $\dot{V}w$ exceeds the velocity-increase reference value $+\dot{V}w_0$, the signal $\alpha$ rises, making the output of the AND gate 40 low level. In this case, since the output of the AND gate 35 is at low level, the output of the OR gate 42 is also at low level so that the solenoid 38 is demagnetized, and the inlet valve Vil is closed. As a result, the brake pressure Pb is made to remain constant.

At time $t_{12}$, when the wheel velocity Vw exceeds the second reference wheel velocity $V_{r2}$, the signal $S_2$ falls and, if the wheel velocity Vw exceeds the first reference velocity $V_{r1}$ at time $t_{13}$, the signal $S_1$ also falls, the brake pressure Pb is still kept constant, thus preventing the occurrence of locking. When the wheel acceleration $\dot{V}w$ becomes lower than the velocity-increase reference value $+\dot{V}w_0$ again at time $t_{14}$, the level of the signal $\alpha$ drops and the outlet valve Vol is accordingly opened. This means that the brake pressure begins to increase.

At time $t_{15}$, when the wheel acceleration $\dot{V}w$ becomes lower than the reference wheel deceleration $-\dot{V}w_0$, the signal $\beta$ rises and, as the wheel velocity Vw becomes lower than the first reference wheel velocity $V_{r1}$ at time $t_{16}$, making signal $S_1$ rise, the inlet valve Vil is opened and the outlet valve Vol is closed. The brake pressure Pb thus begins to decrease. At time $t_{17}$, when the wheel acceleration $\dot{V}w$ exceeds the reference wheel deceleration $-\dot{V}w_0$, the signal $\beta$ falls and consequently the outlet valve Vol opens, keeping the brake pressure Pb constant.

At time $t_{18}$, when the wheel acceleration $\dot{V}w$ exceeds the velocity-increase reference value $+\dot{V}w_0$, the signal $\alpha$ rises and, when the wheel velocity Vw exceeds the first reference wheel velocity $V_{r1}$ at time $t_{19}$, the signal $S_1$ falls. Further, when the wheel acceleration $\dot{V}w$ becomes lower than the velocity-increase reference value $+\dot{V}w_0$ at time $t_{20}$, the signal $\alpha$ falls and consequently the outlet valve Vol opens, raising the brake pressure Pb.

While these processes are being repeated in the same manner subsequently, the wheel velocity decreases without the wheels locking.

In addition, when the signal $S_1$ is output frequently and repetitiously within the time $T_1$, the vehicle is determined to be traveling on a rough road and the signal $S_1$ is forced to remain at low level, so that the degree of reduction in the brake pressure Pb while traveling on the rough road may decrease slightly, thus preventing any increase in the braking distance.

FIG. 7 shows another embodiment of the present invention wherein the signal S output from the decision circuit 33 is applied to a signal generation interval detection circuit 51 which acts as a signal generation interval detection means. The signal generation interval detection circuit 51 produces a high-level signal, as shown in FIG. 8(b), when the signal $S_1$ is output after an interval less than a predetermined period of $T_2$, as shown in FIG. 8(a). In the same way as in the previous example, the time $T_2$ is set at a value which judges that the wheels are traveling on a rough road, so that a detection signal is output from the signal generation interval detection circuit 51 when the vehicle is traveling along a rough road.

The signal generation interval detection circuit 51 is connected to a delay circuit 49 which outputs a high-level operating signal lasting for a predetermined time interval, as shown in FIG. 8(c), in compliance with the detection signal input from the signal generation interval detection circuit 51, and the operating signal turns a relay switch 50 on.

Accordingly, when a vehicle is determined to be traveling along a rough road by this embodiment of the present invention, the signal $S_1$ is forced to remain at low level until the time $T_3$ has elapsed after the decision has been made. Consequently, the degree of reduction in the brake pressure further decreases while the vehicle is traveling along the rough road, and any increase in the braking distance is effectively prevented.

Needless to say, a signal generation period detection circuit can be provided instead of the signal generation detection circuit 51 to apply the detection signal to the delay circuit 49 when the period of the signal $S_1$ becomes greater than predetermined value.

As set forth above, the control means according to the first embodiment of the present invention comprises decision means for outputting a signal on the assumption that one condition for decreasing the brake pressure has been satisfied when the wheel velocity is lower than a predetermined reference velocity. Further, the control means comprises delay means for outputting an operating signal nullifying the signal output from the decision means until a predetermined period of time has elapsed in response to the signal input from decision means. Thus, although a signal instructing a reduction in the brake pressure is output from the decision means within the time set by the delay means, the vehicle is judged to be traveling along a rough road and the signal is nullified. Accordingly, the degree of reduction in the brake pressure while traveling on a rough road decreases, thus preventing any increase in the braking distance.

According to the second embodiment of the present invention, the control means comprises decision means for outputting a signal on the assumption that one condition for decreasing the brake pressure has been satisfied when the wheel velocity is lower than predetermined reference wheel velocity. The control means also comprises signal generation interval detection means for detecting whether an interval after which the signal is output from the decision means is smaller than a predetermined interval and outputting a signal when the interval is smaller, and delay means for producing an operating signal nullifying the output signal of the decision means until after the reception of the signal from the signal generation interval detection means a set period of time elapses. Thus, the signal generation interval detection means can determine whether or not the vehicle is traveling along a rough road and, because the signal for reducing the brake pressure is nullified by the delay means for the predetermined time after the signal is received from the decision means, the degree of reduction of the brake pressure while traveling along the rough road is further decreased and any increase in the braking distance can effectively be prevented.

It should be understood that the specific form of the invention hereinabove described is intended to be representative only, as certain modifications within the scope of these teachings will be apparent to those skilled in the art. Accordingly, reference should be made to the following claims in determining the full scope of the invention.

I claim:

1. An anti-lock brake device for use with wheel brakes connected to wheels of a vehicle, comprising:
    a hydraulic pressure control circuit for controlling the application of hydraulic brake pressure to the wheel brakes; and
    control means for detecting whether said wheels are likely to lock from rotational velocity characteristics of said wheels on the basis of results of comparison of a wheel velocity with a plurality of reference wheel velocities which include a first reference wheel velocity and a second reference wheel velocity smaller than said first reference wheel velocity, and operating said hydraulic pressure control circuit to reduce said hydraulic brake pressure applied to said wheel brakes when said wheels are likely to lock, said control means further including,
    (a) a decision means for outputting a signal on the assumption that one condition for reducing said hydraulic brake pressure has been satisfied with said wheel velocity being lower than any one of said reference wheel velocities, and
    (b) delay means for outputting an operating signal for nullifying said signal output from said decision means until a predetermined period of time has elapsed when generation of the signal output from the decision means has resulted from comparison of said wheel velocity with said first reference wheel velocity, thereby reducing a degree of reduction of said hydraulic brake pressure, and wherein said delay means is nonresponsive to a signal from said decision means which is generated as a result of comparison of the wheel velocity with said second reference wheel velocity.

2. The anti-lock brake device of claim 1, wherein said control means further comprises signal generation interval detection means for detecting whether an interval after which said signal from the decision means derived from comparison of the wheel velocity with said first reference wheel velocity is output and which continues until output of next signal is smaller than a predetermined interval and outputting a signal when it is smaller than the predetermined interval, said delay means outputting said operating signal after receiving said signal from said signal generation interval detection means.

3. The anti-lock brake device of claim 1, wherein said control means is provided for each of the vehicle wheels.

* * * * *